United States Patent [19]

Robin et al.

[11] Patent Number: 4,871,460

[45] Date of Patent: Oct. 3, 1989

[54] ISOLATION/PURIFICATION OF ISOCYANATE CONDENSATES BY EXTRACTION WITH LIQUID OR SUPERCRITICAL GAS

[75] Inventors: Jean Robin, Lyons; Andre Blind, Caluire, both of France

[73] Assignee: Rhone-Poulenc Chimie, Courbevoie, France

[21] Appl. No.: 327,033

[22] Filed: Mar. 22, 1989

[30] Foreign Application Priority Data

Mar. 22, 1988 [FR] France ............................... 88 04051

[51] Int. Cl.$^4$ .............................................. B01D 11/04
[52] U.S. Cl. ....................................... 210/634; 203/49
[58] Field of Search ................... 210/634, 511; 203/49; 528/498; 568/387, 388

[56] References Cited

U.S. PATENT DOCUMENTS 4,306,058 12/1981 Copelin .............................. 203/49 X

*Primary Examiner*—Frank Spear
*Attorney, Agent, or Firm*—Burns, Doane, Swecker & Mathis

[57] ABSTRACT

Isocyanate condensates containing free NCO groups are separated and purified from crude reaction mixtures thereof which include unreacted excess di- or polyisocyanate monomer and at least one isocyanate antagonist, by extracting such crude reaction mixtures with an inert gas, notably carbon dioxide, in either the liquid or supercritical state; the highly purified isocyanate condensates are well adopted for the production of foams, elastomers, adhesives, paints and varnishes.

13 Claims, No Drawings

ISOLATION/PURIFICATION OF ISOCYANATE CONDENSATES BY EXTRACTION WITH LIQUID OR SUPERCRITICAL GAS

BACKGROUND OF THE INVENTION

1. Field of the Invention:

The present invention relates to the isolation and purification of isocyanate condensates containing free NCO groups, such condensates having been prepared from aliphatic, cycloaliphatic or arylaliphatic di- or polyisocyanates and the isocyanate groups of which are not directly bonded to an aromatic ring.

2. Description of the Prior Art:

It is well known to this art that isocyanate condensates are particularly useful for producing foams, elastomers, adhesives, paints and varnishes having desirable final properties.

These condensates containing free NCO groups are prepared by reacting at least one compound containing at least two functional groups which are reactive with isocyanates with a molar excess of di- or polyisocyanate, optionally in a solvent which is inert with respect to NCO groups. The compound containing functional groups which are reactive with NCO groups may thus contain —OH, —SH and —COOH groups as reactive sites, it being possible, of course, for the functional groups in such a compound to be identical or different. Exemplary of such compounds are diols and polyols. The compound bearing the groups which are reactive with NCO groups may be an aliphatic, cyclic, cycloaliphatic or aromatic diradical; it may itself also be a condensate of simple molecules or a diradical comprising heteroatoms in the molecule chain, if appropriate. The condensates containing free NCO groups may thus be prepared from the following starting materials:

(a) polyesters produced by esterification of one or more di- or polyols with one or more di- or polyacids, or by reacting a cyclic lactone with a di- or polyfunctional molecule containing —OH, —NH$_2$ or —NHR groups, for example;

(b) polyethers produced by condensation of cyclic oxides (ethylene, propylene, butylene or tetramethylene oxide) with a di- or polyfunctional molecule containing —OH, —NH$_2$ or NH groups; and (c) mixed condensates containing polyether and polyester blocks.

These starting materials are reacted with an excess of di- or polyisocyanate, optionally in a solvent which is I5 unreactive with respect to isocyanate groups. Exemplary of such di- or polyisocyanates, representative are:
- 1,3-diisocyanatopropane;
- 1,4-diisocyanatobutane;
- 1,5-diisocyanatopentane;
- 1,6-diisocyanatohexane;
- 1,4-diisocyanato-2-ethylbutane;
- 1,5-diisocyanato-2-methylpentane;
- 1,6-diisocyanato-2,2,4-trimethylhexane;
- 1,6-diisocyanato-2,4,4-trimethylhexane;
- 1,2-diisocyanatocyclohexane;
- 1,4-diisocyanatocyclohexane;
- 1,2-bis(isocyanatomethyl)cyclobutane;
- bis(4-isocyanatocyclohexyl)methane;
- 3,3,5-trimethyl-5-isocyanatomethyl-1-isocyanatocyclohexane;
- 1,4-bis(isocyanatomethyl)benzene; and
- 1,2-bis(isocyanatomethyl)benzene.

These diisocyanates may be used separately or as mixtures of any number thereof.

Thus, for example, 1,6-diisocyanatohexane (HDI), which is one of the preferred diisocyanates, may be used alone, or mixed with 1,5-diisocyanato-2-methylpentane and/or 1,4-diisocyanato-2-ethylbutane; mixtures of these latter two diisocyanates may also be used.

The reaction of excess polyisocyanate with the antagonist compound is carried out according to known procedures, namely, by heating the mixture of both materials, optionally in the presence of a catalyst and/or a solvent.

The common feature of these condensates containing free NCO groups is that, when the reaction is complete, the reaction mixture includes a more or less considerable amount of the diisocyanate employed in excess. This diisocyanate must often be removed from the polycondensate produced, especially because of the toxicity due to the volatility of such diisocyanate. Indeed, when such condensates produced from a diisocyanate such as 1,6-diisocyanatohexane (HDI) are used, the presence of a more or less considerable amount of HDI can present health and safely hazards. These hazards are considerably more pronounced when the condensate is used as a thin layer, as is the case with paints and varnishes, for example, because the emission of toxic HDI vapor can become considerable and exceed the legally permitted limits in the surrounding atmosphere.

Such condensates, especially those produced by reacting polyesters or polyethers with an excess of diisocyanate (these condensates being designated "prepolymers" in most cases), for the manufacture of elastomeric materials, cellular or otherwise. In this case, the prepolymer is reacted with a stoichiometric amount of a reactant which is at least difunctional and which contains functional groups reactive with NCO groups, as indicated above. The final material will contain a more or less appreciable amount of the product of condensation of the excess diisocyanate with the difunctional reactant, the presence of which may impair the properties of the final elastomeric material. In this case, removal of the free diisocyanate would be the only way to produce a prepolymer having a low degree of condensation and a low free diisocyanate content at the same time.

The removal of the excess diisocyanate may be carried out by known means, such as evaporation of extraction with a solvent for the diisocyanate, but a nonsolvent for the condensate. However, evaporation requires the use of high temperatures, which may impair the quality of the condensate. This disadvantage is reflected in secondary reactions when heat is applied, resulting in a product of high viscosity which can form a deposit in the evaporator. Moreover, good exhaustion of the free diisocyanate requires the use of moving thin-film evaporators. These are costly devices and, in this case, mandate frequent shutdowns and cleaning operations, because, in most part, the molten condensate gradually forms a resin in the apparatus. Furthermore, extraction with a solvent for the diisocyanate which is a nonsolvent for the condensate (such as hexane, octane, etc.) is lengthy and cumbersome. In fact, as soon as the nonsolvent is added, the condensate tends to precipitate in the form of a sticky mass from which the free diisocyanate monomer is difficult to extract completely.

SUMMARY OF THE INVENTION

Accordingly, a major object of the present invention is the provision of an improved process for the isolation and purification of isocyanate condensates containing free NCO groups from crude reaction mixtures thereof, which improved process conspicuously ameliorates or avoids those disadvantages and drawbacks to date characterizing the state of this art.

Briefly, the present invention features separating the condensate containing free NCO groups from the excess of free diisocyanate, by treating the crude condensate with an inert gas in the liquid or supercritical state, or with a mixture of such gases. Exemplary such inert gases are carbon dioxide, butane, ethane, propane and ethylene. Carbon dioxide, which is cheap, nontoxic and nonflammable, is the preferred compound. It is also possible to use carbon dioxide as an extractant fluid, preferably in the supercritical state, in combination with another inert gas (coextractant) in the liquid or supercritical state, such as especially propane, ethane or butane. It has thus been determined not only that liquid or supercritical $CO_2$ dissolves and extracts the free diisocyanate present in the condensate, but also that the condensate remains liquid in liquid or supercritical $CO_2$ even when it is solid or resinous in consistency at the extraction temperature. This permits the condensate stripped of its free diisocyanate to be subsequently transported and conveniently dissolved, at a moderate temperature.

DETAILED DESCRIPTION OF THE PREFERRED EMBODIMENTS OF THE INVENTION

More particularly according to the present invention, the extraction is advantageously carried out continuously or discontinuously at a temperature above 31.4° C. (the critical temperature of $CO_2$) and at a pressure ranging from 7.3 to 50 MPa (73 to 500 bars). The temperature preferably ranges from 31.4° C. to 100° C. and the pressure preferably ranges from 7.3 to 35 MPa (73 to 350 bars). This refers to $CO_2$ in the supercritical state. In the liquid state, $CO_2$ is used at a temperature of from 0° to 31° C. and at a pressure of 3 to 50 MPa (30 to 500 bars). It is often preferable to operate at a temperature 20° to 31° C. when the viscosity of the condensate is high. The pressure can range from 6 to 30 MPa (60 to 300 bars).

The condensate containing the free diisocyanate is treated with the $CO_2$ which is liquid or in the supercritical state, mixed, if desired, with a coextractant. The operation can be conducted discontinuously, that is to say, by mixing the condensate containing free NCO to be purified with $CO_2$ in the liquid or supercritical state (and with the coextractant, if desired) in a reactor.

The reaction mass can be treated as soon as the condensation reaction is complete However, bearing in mind the large amounts of excess diisocyanate monomer and, in most cases, of the solvent(s), it may be preferable and more economical to carry out, in a preliminary operation, a rapid removal of most of the excess free diisocyanate, and of the solvent when the latter is present.

This treatment, which is typically a very fast evaporation under reduced pressure, does not require heating to a high temperature. It therefore does not exhibit, or exhibits to only a very small degree, the disadvantage referred to previously, namely, producing a polymeric deposit in the equipment, requiring frequent shutdowns for cleaning.

In practice, therefore, the mass obtained after the condensation reaction is conveyed to a thin-film evaporator which allows most of the solvent and an appreciable amount of the excess diisocyanate monomer to be separated off.

The polyisocyanate obtained, still containing a relatively large amount of free diisocyanate and possibly traces of solvent, is then treated/extracted with liquid $CO_2$ or with $CO_2$ in the supercritical state (and with a coextractant, if desired).

After separation of the carbon dioxide containing the free diisocyanate and possibly solvent, from the purified condensate, the $CO_2$ (and the coextractant, if appropriate) can be separated from the extracted products by depressurizing and/or by increasing the temperature.

The extraction may be conducted in a conventional manner, in apparatus which is per se known to this art.

From a source of the extraction gas (typically carbon dioxide), said gas is transferred into a heat exchanger where it is liquefied. It is then conveyed at the desired pressure, by a pump, to another heat exchanger, where it is heated to the selected extraction temperature.

The extraction gas in the liquid or supercritical state is then conveyed into the extraction unit which may be, for example, a column filled with a packing permitting better contact between the condensate and the extraction gas. The condensate may be introduced at the other end of the column; countercurrent extraction is then carried out. Less frequently, it may be introduced at the same end as the extraction gas; cocurrent extraction is then carried out. The purified condensate is recovered at one end of the extraction column, while the extraction gas entraining the free diisocyanate and possibly solvents is treated in order to separate it from the extracted materials.

This may be carried out by lowering its pressure or by increasing its temperature, or by both lowering its pressure and increasing its temperature. These conditions are intended to modify the solvent capacity of the extraction gas.

The pressure lowering or depressurization may be performed in one or more stages, and the extraction gas may be depressurized down to a pressure equal to atmospheric pressure, or down to a higher pressure, at which point it will be recycled in the case of a continuous process.

In fact, if the extraction gas is recycled, it is economically preferable not to depressurize it down to atmospheric pressure, which would require a greater expenditure of energy to recompress it in the cycle following the process. It is preferable to depressurize it down to a pressure at which the extracted compounds are not, or are very poorly, soluble.

The condensate liquefied by the extraction gas under pressure may be conveyed and depressurized in a vessel of sufficient capacity, from which the depressurized gas will be exhausted, the condensate thus remaining in the form of powder or of viscous liquid on the walls of the vessel. Alternatively, the condensate liquefied by the extraction gas may be received in a solvent or in a mixture of solvents which, after depressurization, yields a condensate solution ready for use.

As indicated above, the subject process can be carried out continuously or discontinuously, and the equipment employed can be that described above, or any other suitable apparatus.

It is generally preferable according to the present invention to employ the extraction gas in the supercritical state.

In order to further illustrate the present invention and the advantages thereof, the following specific examples are given, it being understood that same are intended only as illustrative and in nowise limitative.

EXAMPLE 1:

200 g of polyester, which was an ethylene glycol polyadipate with hydroxyl end groups, and having a molecular weight of 2,000 (exhibiting an acid number of 2 and a hydroxyl number of 56) were charged into a 1,000-cm$^3$ three-necked reactor fitted with a stirrer and an oil heating bath.

The material was melted by heating to 110° C. under a stream of nitrogen. The nitrogen flow was stopped and the apparatus was placed under reduced pressure (1,330 to 2,000 Pa) for 1 hour, under stirring.

The apparatus was restored to atmospheric pressure by introducing dry nitrogen, and was cooled to 80° C. and 33.6 g of 1,6-diisocyanatohexane (HDI) were introduced. The temperature gradually increased and was maintained at 110° C. for 2 hours.

The prepolymer thus obtained was determined, by titration, to contain 3.2% by weight of NCO groups and contained 3.5% by weight of free HDI.

20 g of the prepolymer obtained previously were charged into a pressure-resistant 45-cm$^3$ reactor and were melted at 80° C.

The temperature was maintained at 80° C., and $CO_2$ was introduced up to a pressure of 14 MPa, which was maintained by means of a pressure regulator.

When the system was at equilibrium, $CO_2$ was injected at the base of the reactor at a rate of 500 g/hour.

After 2 hours of extraction, the amount extracted was 0.8 g (after removal of $CO_2$), including 0.6 g of HDI.

The remaining prepolymer now contained only 0.05% by weight of HDI.

EXAMPLE 2:

A prepolymer was prepared as described in Example 1, but with the polyester replaced with a polyether (polytetrahydrofuran having a molecular weight of 2,000, marketed by Du Pont as Terathane 2000).

The prepolymer thus obtained was determined, by titration, to contain 3.8% by weight of NCO groups and contained 3.7% by weight of free HDI.

20 g of this prepolymer were treated with $CO_2$ in the supercritical state in the reactor described in Example 1, for 2 hours at 60° C. at 18.5 MPa.

0.7 g of HDI were extracted in this manner, and the treated prepolymer no contained only 0.03% by weight of free HDI.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the isolation and purification of isocyanate condensates containing free NCO groups from a crude reaction mixture thereof which comprises unreacted excess di- or polyisocyanate monomer and at least one isocyanate antagonist compound, comprising extracting such crude reaction mixture with an inert gas in either the liquid or supercritical state.

2. The process as defined by claim 1, said isocyanate condensates having been prepared from a stoichiometric excess of at least one aliphatic, cycloaliphatic and/or arylaliphatic di- or polyisocyanate monomer and at least one antagonist compound containing at least two functional groups reactive with NCO groups.

3. The process as defined by claim 2, said at least one isocyanate monomer comprising 1,3-diisocyanatopropane; 1,4-diisocyanatobutane; 1,5-diisocyanatopentane; 1,6-diisocyanatohexane; 1,4-diisocyanato-2-ethylbutane; 1,5-diisocyanato-2-methylpentane; 1,6-diisocyanato-2,2,4trimethylhexane; 1,6-diisocyanato-2,4,4-trimethylhexane; 1,2-diisocyanatocyclohexane; 1,4-diisocyanatocyclohexane; 1,2-bis(isocyanatomethyl)cyclobutane; bis(4-isocyanatocyclohexyl)methane; 3,3,5-trimethyl-5-isocyanatomethyl-1-isocyanatocyclohexane; 1,4-bis(isocyanatomethyl)benzene; or 1,2-bis(isocyanatomethyl)benzene.

4. The process as defined by claim 2, said at least one isocyanate monomer comprising 1,6-diisocyanatohexane, or mixture thereof.

5. The process as defined by claim 2, said antagonist compound comprising a polyester, polyether or mixed polyester/polyether.

6. The process as defined by claim 1, said inert gas comprising carbon dioxide in either the liquid or supercritical state.

7. The process as defined by claim 6, said inert gas further comprising a coextractant in either the liquid o supercritical state.

8. The process as defined by claim 7, wherein the carbon dioxide is in the supercritical state, and said coextractant comprising propane, ethane or butane.

9. The process as defined by claim 6, carried out at a temperature of from 0 to 31° C. and at a pressure of 3 to 50 MPa.

10. The process as defined by claim 9, carried out at a temperature of from 20° to 31° C. and at a pressure of 6 to 30 MPa.

11. The process as defined by claim 6, carried out at a temperature above the critical temperature of carbon dioxide and at a pressure of 7.3 to 50 MPa.

12. The process as defined by claim 11, carried out at a temperature below 100° C. and at a pressure of 7.3 to 35 MPa.

13. The process as defined by claim 1, comprising removing the majority of said excess isocyanate monomer prior to extracting the crude reaction mixture with said inert gas in either the liquid or supercritical state.

* * * * *